United States Patent [19]

Jeong et al.

[11] Patent Number: 5,614,959

[45] Date of Patent: Mar. 25, 1997

[54] METHOD AND APPARATUS FOR MOTION ESTIMATION

[75] Inventors: Jechang Jeong, Seoul; Wooyoun Ahn, Suwon, both of Rep. of Korea

[73] Assignee: Samsung Electronics Co., Ltd., Kyungki-do, Rep. of Korea

[21] Appl. No.: 546,926

[22] Filed: Oct. 23, 1995

Related U.S. Application Data

[62] Division of Ser. No. 129,081, filed as PCT/KR93/00009, Nov. 30, 1993, Pat. No. 5,489,949.

[30] Foreign Application Priority Data

Feb. 8, 1992 [KR] Rep. of Korea .................. 92-1845

[51] Int. Cl.$^6$ ............................................. H04N 7/36
[52] U.S. Cl. ............................................. 348/699
[58] Field of Search ................................. 348/699, 402, 348/413, 416; H04N 7/36

[56] References Cited

U.S. PATENT DOCUMENTS

| | | | |
|---|---|---|---|
| 4,937,666 | 6/1990 | Yang | 348/413 |
| 4,989,087 | 1/1991 | Pele | 348/416 |
| 5,241,608 | 8/1993 | Fogel | 348/699 |
| 5,280,351 | 1/1994 | Wilkinson | 348/699 |
| 5,289,274 | 2/1994 | Kondo | 348/699 |

*Primary Examiner*—Howard W. Britton
*Attorney, Agent, or Firm*—Sughrue, Mion, Zinn, Macpeak & Seas

[57] ABSTRACT

A method and apparatus for motion estimation in accordance with the present invention compares image signals of image blocks within a previous frame corresponding to a motion vector detected among error values used for detecting the motion vector of a pixel unit and surrounding image blocks which are generated by moving the reference image block to every direction per one pixel respectively with the image signal of image blocks within a present frame which the motion estimation is performed, and then generates error values according to the comparison results. By vertically comparing the generated error values, a vertical component in the motion vector of a half-pixel unit is detected. By horizontally comparing the generated error values, a horizontal component to the motion vector of a half-pixel unit is detected. Accordingly, the present invention leads to a greater efficiency to reduce the amount of data to be processed for the detection of the motion vector of a half-pixel unit.

5 Claims, 3 Drawing Sheets

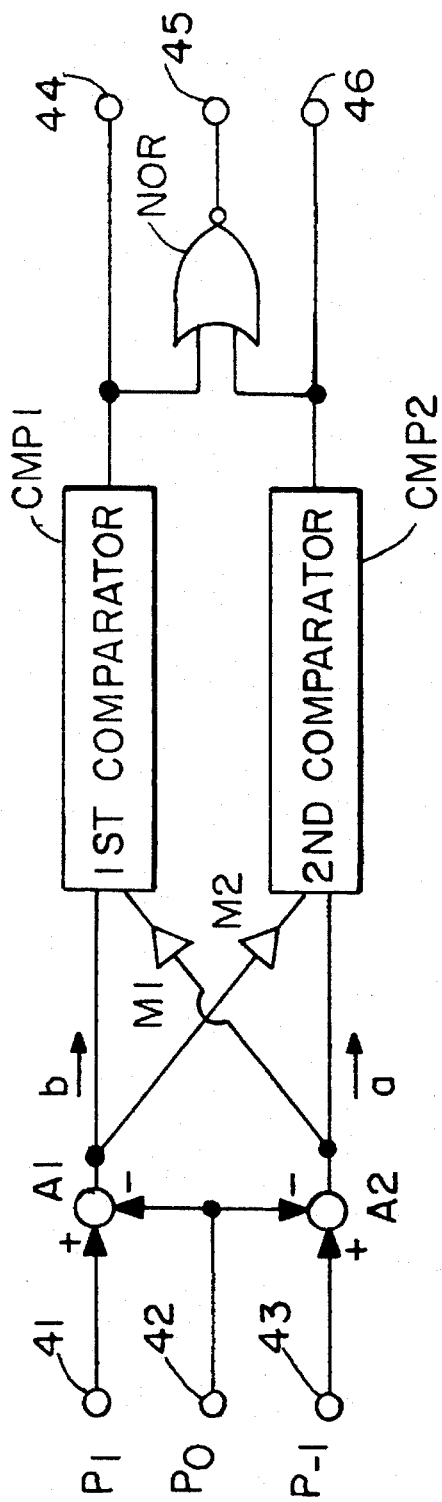
FIG. 4
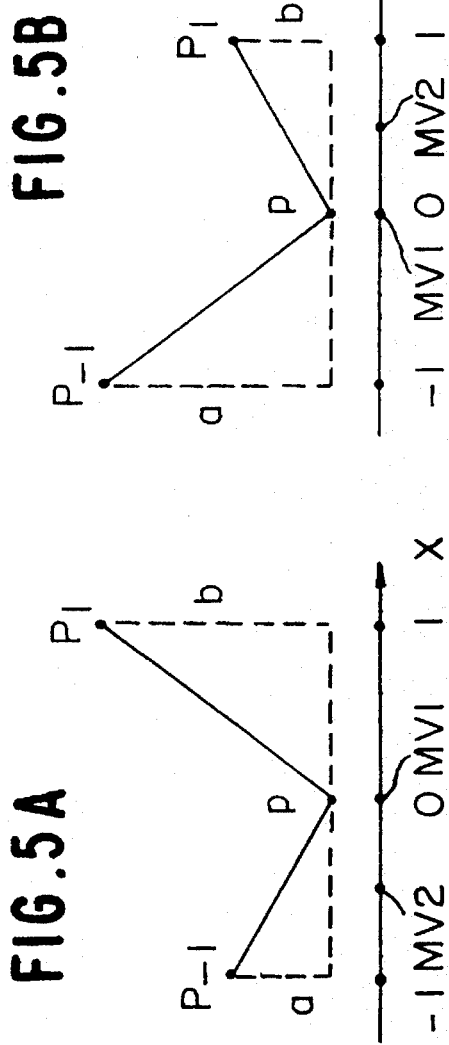
FIG. 5A
FIG. 5B

METHOD AND APPARATUS FOR MOTION ESTIMATION

This a Divisional Application of a PCT/KR93/00009 application, application No. 08/129,081, filed Nov. 30, 1993, now U.S. Pat. No. 5,489,949.

FIELD OF THE INVENTION

The present invention relates to a method and apparatus for motion estimation, and more particularly relates to a method and apparatus for further a detailed motion estimation, in which uses an error value generated at an estimation of motion for determining a motion vector, in especially differential pulse code modulation (DPCM) method for coding a digital image signal.

DESCRIPTION OF RELATED ART

Generally, there are several coding methods for further efficiently compressing transmission data in an image signal processing apparatus using subsequent digital image signals, such as high definition television (HDTV), Digital VTR (digital video tape recorder), and multi-media, etc. The DPCM method, which codes the digital image signal using data correlations which are present between adjacent frames of the image signal.

In the case of coding a difference signal between adjacent flames representing different times using the DPCM method, it is disadvantageous that much more data needs to be coded for an active image rather than a still image. However, by recognizing a movement location from a certain block of the previous frame to a specific block in the present frame, that is, the best similarity between a specific image of the present frame and a certain image of the previous frame, efficient data compression can be performed because signal difference values of similar blocks between frames can be minimized. Accordingly, in the motion estimation using the DPCM method, difference data between a predetermined image block of the previous frame and the corresponding image block of the present frame is coded, thereby permitting efficiency of the transmission to be enhanced. In the motion estimation method, a motion vector represents a moving direction and magnitude of the image block obtained by comparing an image block within the present frame with the corresponding image block of the previous frame.

There are several methods for generating motion estimates in terms of a pixel unit. Generally, since motion between two frames separated in time may be small with respect to an integer-pixel unit, errors may be introduced during motion compensation when using the motion vector of an integer-pixel unit. Therefore, a motion vector of a sub-pixel unit is used for reducing motion compensation errors. A half-pixel unit, as one estimation method of sub-pixel units, is commonly used for the motion estimation. A motion estimation method using a half-pixel unit in accordance with a conventional method win be briefly described.

The apparatus of FIG. 1 comprises $N_1 \times N_2$ block constructor 1 for receiving an image signal of the present frame and constructing an image block composed of $N_1 \times N_2$ pixels; $M_1 \times M_2$ search range constructor 2 for receiving the image signal of the previous frame and constructing the image block composed of $M_1 \times M_2$ pixels; a first search unit 3 for receiving the image signals output from the $N_1 \times N_2$ block constructor 1 and the $M_1 \times M_2$ search range constructor 2 and detecting a first motion vector MV1 of a pixel unit; a half-pixel interpolating unit 4 for receiving image signals output from the $M_1 \times M_2$ search range constructor 2 and the first search unit 3 and calculating an image signal value in a half-pixel location around reference pixels, using the image block within the previous frame which is determined by the first motion vector MV1 detected from the first search unit 3 and the image blocks which are obtained by moving the image block at intervals of one pixel; a second search unit 5 for receiving the image signals output from the $N_1 \times N_2$ block constructor 1 and the half-pixel interpolating unit 4 and outputting a second motion vector MV2 of a half-pixel unit; and a summing unit 6 for receiving and summing the output signals MV1, MV2 from the first search unit 3 and the second search unit 5, respectively, and outputting a motion vector MV.

The $N_1 \times N_2$ block constructor 1 receives the image signal of the present frame and stores the input signal in $N_1 N_2$ sized blocks. Simultaneous with inputting the image signal of the present frame, the $M_1 \times M_2$ search range constructor 2 receives the image signal from the previous frame and constructs a search range of magnitude $M_1 \times M_2$. The first search unit 3 moves the $N_1 \times N_2$ block of the present frame by pixel units within the search range of the previous frame. In comparing data of a pixel unit between two blocks, the first motion vector MV1 of an integer-pixel unit is calculated for a block location within the search range where a mean squared error MSE or a mean absolute error MAE, is a minimum. The first motion vector MV1 of an integer-pixel unit generated from the first search unit 3 is output to the summing unit 6 and the half-pixel interpolating unit 4. The half-pixel interpolating unit 4 linearly interpolates the reference pixels of a designated block within the previous frame using the first motion vector MV1 of an integer-pixel unit and the surrounding pixels, calculates half-pixel values, and then outputs the calculated values to the second search unit In FIG. 2, "O" illustrates pixel unit intervals and "x" indicates half-pixel unit intervals. The second search unit 5 moves the image block of the previous frame corresponding to the first motion vector MV1 of an integer-pixel unit to every direction in half-pixel units, respectively, searches for a location having a minimum motion compensation error among locations x for the obtained eight half-pixel motion vectors and the first motion vector MV1, and outputs one of vector components (−½, 0, ½), that is, a minutely controlled value in a half-pixel unit. The summing unit 6 sums the first motion vector MV1 in integer-pixel units output from the first search unit 3 and the second motion vector MV2 in half-pixel units from the second search unit 5, to thereby generate a complete motion vector MV for the motion estimation. For example, the summing unit 6 sums the horizontal component (−½) of the second motion vector MV2 of a half-pixel unit from the second search unit 5 with the motion vector (MV1=(x, y)) of a pixel unit from the first search unit 3, and then determines the motion vector (MV= (x−½, y)).

The above-described conventional method determines the location of blocks using the motion vector of a pixel interval unit, linearly interpolates corresponding pixel values between the determined block and surrounding pixels of the block. The method uses the interpolated half-pixel values and the block pixel values of the present frame determined by the motion vector in integer-pixel units, and selects the most similar block among eight half-pixel motion positions, that is, "x" of FIG. 2. Accordingly, the conventional method has a drawback in that it takes too long in processing data for estimating the motion vector in half-pixel units.

SUMMARY OF THE INVENTION

In order to solve the above-identified problem, an object of the present invention is to provide a method for motion estimation which makes compensation of further detailed motion possible, wherein error values are used for in forming estimation of motion vectors between flames, by generating error values according to the result of comparing data between predetermined image blocks within a previous frame determined by the motion vector in pixel units and image blocks obtained by moving the image block to every direction by one pixel respectively, comparing the thus generated errors, and estimating the motion vector in sub-pixel units.

Another object of the present invention is to provide an apparatus for motion estimation making compensation of further detailed motion possible, by employing error values used for estimation of motion vectors between flames, by generating error values by comparing data between predetermined image blocks within the previous frame determined by the motion vector in pixel units with image blocks obtained by moving the image block in every direction by one pixel unit respectively, comparing generated errors, and estimating the motion vector in sub-pixel units.

These and other objects, features and advantages according to the present invention are accomplished by a method for comparing an image signal between adjacent frames and estimating a motion of the image. The method comprises the steps of constructing a first image block representing an image signal of a present frame and a second image block having the image signal of a previous frame; comparing the image signal of a plurality of image blocks which are present within the second image block and have a block size equal to the first image block with the image signal within the first image block, and generating a number of error values; detecting a first motion vector of a pixel unit using the generated error values; comparing the image signals of a reference image block, namely, an image block of the previous frame corresponding to the first motion vector, and surrounding image blocks which are generated by moving the reference image block to every direction per one pixel each with the image signal of the first image block, and outputting error values generated by the result of comparison; generating a second motion vector in half-pixel units using the generated error values; and summing the first and second motion vectors.

These and other objects, features and advantages according to the present invention are achieved by an apparatus for comparing an image signal between adjacent frames and estimating a motion of the image. The apparatus comprises means for receiving the image signal of a present frame and constructing a first image block; means for receiving the image signal of a previous frame and constructing a second image block; search means for receiving the image signals output from the first image block constructor and the second image block constructor, detecting a first motion vector in pixel units, comparing the image signals of surrounding image blocks, which are generated by moving the reference image block within the previous frame corresponding to the detected first motion vector in every direction by one pixel, respectively, and the reference image block with the image signal of the first image block, and generating error values obtained as a result of respective comparisons; half-pixel control means for receiving the errors output from the search means and generating a second motion vector having a half-pixel unit; and summing means receiving the first and second motion vectors, for adding and outputting them.

BRIEF DESCRIPTION OF THE DRAWINGS

FIG. 4 is a detailed block diagram illustrating a horizontal half-pixel controller of FIG. 3.

FIG. 5 is a conceptual diagram showing a method for determining motion vectors of a half-pixel unit in the horizontal half-pixel controller.

DETAILED DESCRIPTION OF THE PREFERRED EMBODIMENTS

A motion vector of a predetermined block in a present frame corresponding to a search range of a previous frame represents as MV=(x, y). Here, the motion vector MV has a horizontal component of motion vector x and a vertical component of motion vector y. Hereinafter, the present invention will be described using a half-pixel unit, i.e., a kind of sub-pixel unit.

Figure 1:
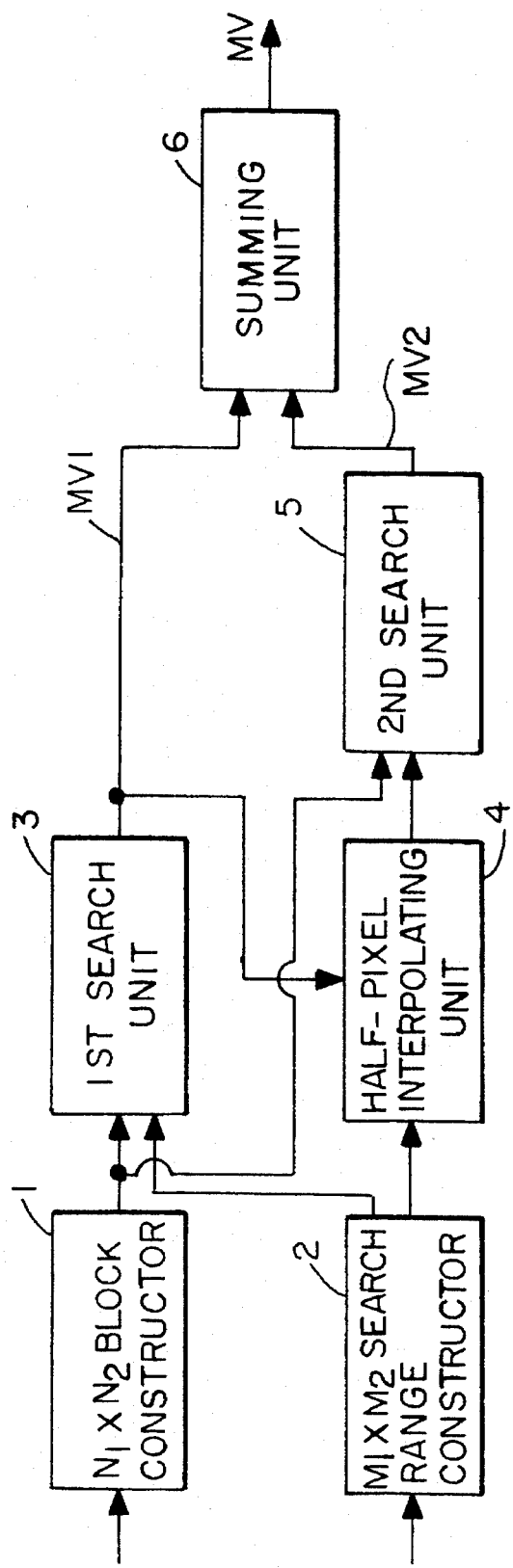
FIG. 1 is a block diagram for illustrating a conventional apparatus used for half-pixel motion estimation.
Figure 2:
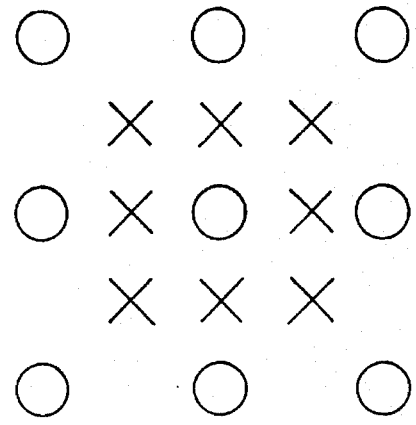
FIG. 2 is a conceptual diagram for showing a pixel unit and a half- pixel unit.
Figure 3:
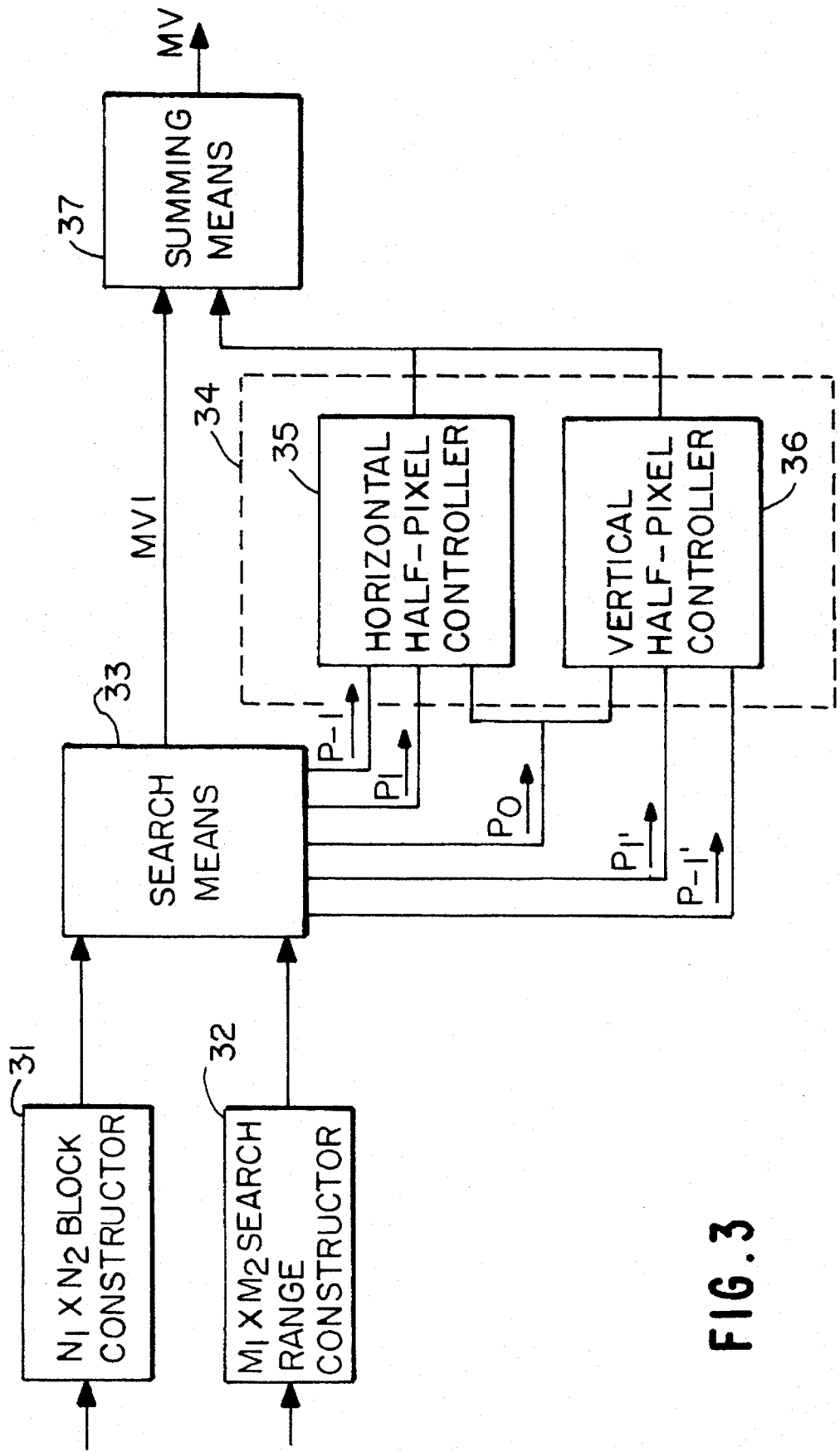
FIG. 3 is a block diagram illustrating an apparatus for performing motion estimation in accordance with a preferred embodiment of the present invention.

FIG. 3 is a block diagram illustrating an apparatus for motion estimation in accordance with a preferred embodiment of the present invention.

The apparatus of FIG. 3 comprises $N_1 x N_2$ block constructor 31 for receiving an image signal of the present frame and constructing image blocks composed of $N_1 x N_2$ pixels; $M_1 x M_2$ search range constructor 32 for receiving the image signal of the previous frame and constructing image blocks composed Of $M_1 x M_2$ pixels; search means for receiving the image signals output from the $N_1 x N_2$ block constructor 31 and the $M_1 x M_2$ search range constructor 32, for detecting a first motion vector MV1 in pixel units, comparing data between five image blocks generated by moving a block of $N_1 x N_2$ size to every direction by one pixel, with respect to an image block centered on a reference pixel within the previous frame corresponding to the detected first motion vector MV1, and the image block within the present frame, and generating error values produced as a result of respective comparisons; half-pixel control means 34 for receiving the errors output from the search unit 33 and calculating a second motion vector MV2 in respective half-pixel interval vertically and horizontally based on the reference pixel; and summing unit 37 receiving the first motion vector MV1 from the search unit 33 and the second motion vector MV2 from the half-pixel control means 34, summing the respective vectors and outputting a resultant motion vector MV.

The half-pixel control means 34 includes a horizontal half-pixel controller 35 for detecting a horizontal component of the second motion vector MV2 and vertical half-pixel controller 35 for detecting a vertical component of the second motion vector MV2.

Of the image signals for two adjacent frames separated in time, the $N_1 x N_2$ block constructor 31 receives the image signal of the present frame and stores the input signal in a size of $N_1 x N_2$ block. Simultaneously with inputting the image signal of the present frame, the $M_1 x M_2$ search range constructor 32 receives the image signal of the previous frame and stores it in a size of $M_1 x M_2$ block, which advantageously is larger than $N_1 x N_2$ block. The search unit 33 receives respectively the image signals of the stored $M_1 x M_2$ block and $N_1 N_2$ block output from the $M_1 x M_2$ search range constructor 32 and the $N_1N_2$ block constructor 31, respectively A motion estimation error obtained by estimating the motion vector of an integer-pixel unit is represented by $P_0$. Motion estimation errors which are generated by moving in every direction by one pixel, respectively, on the basis of the estimated motion vector, are respectively $P_1'$, $P_{-1}'$, $P_{-1}$, and $P_1$. Mean absolute error MAE, or mean squared error MSE advantageously can be used for calculating motion estimation errors. Equations which preferably can be used to calculate the horizontal motion estimation errors ($P_0$, $P_1$, $P_{-1}$) by the MAE are as follows:

$$P_0 = \sum_{m=0}^{N-1} \sum_{n=0}^{N-1} |Y(Nk+m, Nl+n) - Y'(Nk+m+x, Nl+n+y)| \quad (1)$$

$$P_1 = \sum_{m=0}^{N-1} \sum_{n=0}^{N-1} |Y(Nk+m, Nl+n) - Y'(Nk+m+x+1, Nl+n+y)| \quad (2)$$

$$P_{-1} = \sum_{m=0}^{N-1} \sum_{n=0}^{N-1} |Y(Nk+m, Nl+n) - Y'(Nk+m+x-1, Nl+n+y)| \quad (3)$$

Where Y represents the image signal of the present frame, Y' represents that of the previous frame, and $N_1=N_2=N$ represent block size. In the above equations, (k, l) represents position from the top left position of the frames. It will be appreciated that the vertical motion estimation errors ($P_1'$, $P_{-1}'$) can be calculated by the same method as noted by the above listed equation.

The search unit 33 compares, in pixel units, the data magnitude between the image block of the present frame and a plurality of previous image blocks, which are present within the search range of the previous frame and have similar sizes, and calculates motion estimation errors as a result of respective comparisons. The first motion vector MV1, in integer-pixel units is determined at a block location where the motion estimation error is a minimum, and is output to the summing unit 37. The search unit 33 calculates the motion estimation errors ($P_{-1}$, $P_1$, $P_0$, $P_{-1}'$, $P_1'$) by the reference image block within the previous frame determined by the motion vector MV1 in integer-pixel units and a number of image blocks surrounding the reference image block and shifted by one pixel. Then, the calculated motion estimation errors ($P_{-1}$, $P_1$, $P_0$, $P_{-1}'$, $P_1'$) are output to the half-pixel control means 34. Advantageously, the present invention simultaneously and individually determines the horizontal and vertical components of motion vector in half-pixel units. However, since the horizontal half-pixel controller 35 and the vertical half-pixel controller 36 use the same methodology, description will be limited to a method for determining the horizontal component of a motion vector in half-pixel units.

FIG. 4 is a detailed block diagram illustrating the horizontal half-pixel controller of FIG. 3.

The device of FIG. 4 includes three input terminals 41, 42, 43 for receiving the motion estimation errors ($P_1$, $P_0$, $P_{-1}$); a first adder A1 for adding and outputting the input signal $P_1$ of a first input terminal 41 and the input signal $P_0$ of a second input terminal 42; a second adder A2 for adding and outputting the input signal $P_0$ of the second input terminal 42 and the input signal $P_{-1}$ of a third input terminal 43; a first comparator CMP1, having a predetermined input terminal coupled to an output terminal of the first adder A1, for comparing respective input signals; a second comparator CMP2, having a predetermined input terminal coupled to an output terminal of the second adder A2, for comparing respective input signals; a second multiplier M2 for multiplying the output signal of the first adder A1 by a predetermined coefficient and outputting a multiplied value to the second comparator CMP2; a first multiplier M1 for multiplying the output signal of the second adder A2 by a predetermined coefficient and outputting a multiplied value to the first comparator CMP1; and a NOR gate NOR for performing a logical NOT OR function or respective output signals from the comparators CMP1, CMP2. The device further comprises three output terminals 44, 45, 46 to distinguish each of the output signals from first comparator CMP1, NOR gate NOR and second comparator CMP2.

The motion estimation errors ($P_1$, $P_0$, $P_{-1}$,) output from the search unit 33 are input to the horizontal half-pixel controller 35 of the half-pixel control means 34. Then, the first adder A1 subtracts the signal $P_0$ input through the second terminal 42 input from the input signal $P_1$ through the input first terminal 41. The second adder A2 subtracts the signal $P_0$ input through the second input terminal 42 from the signal $P_{-1}$ input through the third input terminal 43. The first and second multipliers M1, M2 multiply by respective predetermined coefficient each of the adder output signals and output the multiplied result to the comparators CMP1, CMP2, connected to the output of the multipliers, respectively. Advantageously, a difference value (a) between $P_0$ and $P_{-1}$ and (b) between $P_0$ and $P_1$ are respectively input to the second comparator CMP2 and the first comparator CMP1. Preferably, the first comparator CMP1 compares and outputs the output signals from the first adder A1 and the first multiplier M1. The second comparator CMP2 compares and outputs the output signals from the second adder A2 and the second multiplier M2.

FIGS. 5(a) and 5(b) are conceptual diagrams showing a method for determining motion vectors in half-pixel units in the horizontal half-pixel controller 35. FIG. 5(a) shows that the motion vector MV2 of a half-pixel unit is present at the left with respect to the motion vector MV1 of a pixel unit, and FIG. 5(b) shows that the motion vector MV of a half-pixel unit is present at the right with the motion vector MV1 of a pixel unit.

In FIG. 5(a), when $P_1$ is larger than $P_{-1}$ (that is, b is larger than a) indicates that the motion vector MV is located about ½ the distance from the first motion vector MV1 in pixel units to the left. In FIG. 5(b), when $P_{-1}$ is larger than $P_1$ on the basis of $P_0$ (that is, a is larger than b) indicates that the motion vector MV is located about ½ way from the first motion vector MV1, in pixel units to the right.

In FIG. 5(a), for the case where $P_1$ is larger than $P_{-1}$ on the basis of $P_0$, only the output 44 of the first comparator CMP1 is "high". Thus, the horizontal half-pixel controller 35 outputs "–½", as the horizontal component value of the second motion vector MV2. In FIG. 5(b), for the case where $P_{-1}$ is larger than $P_1$ on the basis of $P_0$, only the output 46 of the second comparator CMP2 is "high". Thus, the horizontal half-pixel controller 35 outputs "½" as the horizontal component value of the second motion vector MV2. Where $P_1$ and $P_{-1}$, on the basis of $P_0$, are equal to each other, the output signals of the two comparators CMP1, CMP2 are both "low". Therefore, the NOR gate NOR receives low values and its output signal becomes "high". Accordingly, the horizontal component of the second motion vector MV2 becomes "O".

The summing unit 37 receives the second motion vector MV2 and adds it to the first motion vector MV1, in pixel units, obtained by the search unit 33, thereby estimating the second motion vector MV2 in half-pixel units.

It will be appreciated that a method and apparatus for motion estimation in accordance with the present invention compares image signals of image blocks within a previous frame corresponding to a motion vector detected among error values used for detecting the motion vector of a pixel unit and surrounding image blocks which are generated by moving the reference image block to every direction per one pixel respectively with the image signal of image blocks within a present frame which the motion estimation is performed, and then generates error values according to the comparison results. By vertically comparing the generated error values, a vertical component in the motion vector in half-pixel units is detected. By horizontally comparing the generated error values, a horizontal component to the motion vector in half-pixel units is detected. Accordingly, the present invention leads to a greater efficiency in motion estimation by reducing the amount of data which must be processed for the detection of the motion vector in half-pixel units.

We claim:

1. A method for estimating a respective motion between adjacent frames of an image, comprising the steps of:

(a) constructing a first image block based on a respective image signal of a present frame;

(b) constructing a second image block based on a respective image signal of an adjacent frame, said second image block having a plurality of third image blocks;

(c) generating a plurality of error values, each of the error values being generated by comparing a respective image signal of one of the third image blocks with the respective image signal of said first image block;

(d) generating a first motion vector in pixel units based on said plurality of error values;

(e) establishing a reference image block within said second image block based on said first motion vector;

(f) generating as a first output error value the error value corresponding to the reference image block, and generating a plurality of second output error values, each of which is the error value which corresponds to the respective third image block which is removed from the reference image block in one of a plurality of directions by one pixel;

(f) generating a second motion vector of half-pixel units based on said first and second output error values;

(g) summing said first and second motion vectors to produce a motion estimation vector.

2. The method for estimating a respective motion between adjacent frames of an image as set forth in claim 1, wherein said step (f) further comprises the sub-steps of:

(f1) generating a horizontal component of said second motion vector, using the first output error value and those of the second output error values which correspond to the third image blocks which are one pixel removed from the reference image block in a horizontal direction; and (f2) generating a vertical component of said second motion vector, using the first output error value and those of the second output error values which correspond to the third image blocks which are one pixel removed from the reference image block in a vertical direction.

3. An apparatus for estimating a respective motion between adjacent frames of an image, comprising:

means for receiving a respective image signal of a present frame, constructing a first image block based on the respective image signal of a present frame, and outputting a respective image signal corresponding to the constructed first image block;

means for receiving a respective image signal of an adjacent frame, constructing a second image block based on the respective image signal of an adjacent frame, said second image block having a plurality of third image blocks, and outputting a respective image signal corresponding to the constructed second image block, said respective image signal corresponding to the constructed second image block including respective image signals corresponding to each of said plurality of third image blocks;

search means for receiving the respective image signals corresponding to the constructed first and second image blocks, generating a plurality of error values, each of the error values being generated by comparing one of the respective image signals of said plurality of third image blocks with the respective image signal of said first image block, generating a first motion vector in pixel units based on said plurality of error values, establishing a reference image block within said second image block based on said first motion vector, outputting as a first output error value the error value corresponding to the reference image block, and outputting a plurality of second output error values, each of which is the error value which corresponds to a respective third image block which is removed from the reference image block in one of a plurality of directions by one pixel;

half-pixel control means for receiving the first and second output error values and generating a second motion vector of half-pixel units based on said first and second output error values; and summing means for receiving said first and second motion vectors and outputting a motion estimation vector which is a sum of said first and second motion vectors.

4. The apparatus set forth in claim 3, wherein said half-pixel control means comprises:

a horizontal half-pixel controller for generating a horizontal component of said second motion vector, using the first output error value and those of the second output error values which correspond to the third image blocks which are one pixel removed from the reference image block in a horizontal direction; and a vertical half-pixel controller for generating a vertical component of said second motion vector, using the first output error value and those of the second output error values which correspond to the third image blocks which are one pixel removed from the reference image block in a vertical direction.

5. The apparatus set forth in claim 4, wherein said half-pixel control means comprises:

a first subtracter for subtracting the first output error value from the second output error value which corresponds to the respective third image block which is removed from the reference image block to the right by one pixel;

a second subtracter for subtracting the first output error value from the second output error value which corresponds to the respective third image block which is removed from the reference image block to the left by one pixel;

a first multiplier for multiplying a respective first output signal of said second subtracter by a predetermined coefficient and producing a first multiplied value;

a first multiplier for multiplying a respective second output signal of said first subtracter by said predetermined coefficient and producing a second multiplied value;

a first comparator, receiving said second output signal and said first multiplied value, for comparing respective magnitudes of the received first comparator inputs, thereby providing a first binary signal as a comparison result;

a second comparator, receiving said first output signal and said second multiplied value, for comparing respective magnitudes of the received second comparator inputs, thereby providing a second binary signal as a comparison result; and a NOR gate, receiving said first and second binary signals from said first and second comparators, respectively, for performing a logical NOR function, thereby producing an operated value indicative of said second motion vector.

* * * * *